US009473726B2

(12) United States Patent
Ma et al.

(10) Patent No.: US 9,473,726 B2
(45) Date of Patent: Oct. 18, 2016

(54) ULTRA HIGH DEFINITION DISPLAY DEVICE AND VIDEO SIGNAL CONVERTING METHOD

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Xitong Ma, Beijing (CN); Xiao Zhang, Beijing (CN); Xinshe Yin, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/418,413

(22) PCT Filed: May 21, 2014

(86) PCT No.: PCT/CN2014/078024
§ 371 (c)(1),
(2) Date: Jan. 29, 2015

(87) PCT Pub. No.: WO2015/100920
PCT Pub. Date: Jul. 9, 2015

(65) Prior Publication Data
US 2016/0021326 A1    Jan. 21, 2016

(30) Foreign Application Priority Data

Dec. 31, 2013 (CN) .......................... 2013 1 0750548

(51) Int. Cl.
H04N 5/44         (2011.01)
H04N 5/38         (2006.01)
(Continued)

(52) U.S. Cl.
CPC ........ H04N 5/44 (2013.01); G06F 3/14 (2013.01); G06F 3/1407 (2013.01); H04N 5/38 (2013.01);
(Continued)

(58) Field of Classification Search
CPC ............. H04N 5/44; H04N 5/38; G06F 3/14
See application file for complete search history.

(56) References Cited

U.S. PATENT DOCUMENTS

| 6,462,786 B1 * | 10/2002 | Glen | ...................... G09G 5/006 348/453 |
| 7,206,025 B2 * | 4/2007 | Choi | ...................... G09G 5/006 348/441 |
| 7,333,149 B2 * | 2/2008 | Choi | ........................ G06T 3/40 348/441 |

(Continued)

FOREIGN PATENT DOCUMENTS

| CN | 102893626 A | 1/2013 |
| CN | 103024313 A | 4/2013 |

(Continued)

OTHER PUBLICATIONS

SIPO of China, Chinese Office Action in counterpart Chinese Patent Application No. 201310750548.3 with English translation, Jun. 30, 2015, 11 pages.

(Continued)

*Primary Examiner* — Brian Yenke
*Assistant Examiner* — Sean Haiem
(74) *Attorney, Agent, or Firm* — Kinney & Lange, P.A.

(57) ABSTRACT

An ultra high definition display device and a video signal converting method are provided. The ultra high definition display device comprises a first input port configured to receive a first signal; a control module configured to generate a first enabling signal; a first receiver module configured to receive the first signal from the first input port according to the first enabling signal, and generate a second signal by a format conversion, both the first signal and the second signal being full high definition signals; a resolution transformation module configured to transform the second signal in resolution to generate a third signal, the third signal being an ultra high definition signal; and a transmission module configured to convert the third signal into an ultra high definition display signal and output the display signal. The device and method according to embodiments of the present invention may receive a full high definition signal, and achieve conversion from a full high definition signal to an ultra high definition signal display signal for output under the control of the control module.

8 Claims, 4 Drawing Sheets

(51) Int. Cl.
*H04N 7/01* (2006.01)
*G06F 3/14* (2006.01)
*H04N 21/4402* (2011.01)

(52) U.S. Cl.
CPC .............. *H04N 7/01* (2013.01); *H04N 7/0125* (2013.01); *H04N 21/440218* (2013.01); *G09G 2340/0407* (2013.01)

(56) References Cited

U.S. PATENT DOCUMENTS

| 2007/0200859 A1* | 8/2007 | Banks | G06F 3/14 345/520 |
| 2009/0033808 A1* | 2/2009 | Maeda | G03B 33/06 348/756 |
| 2015/0139614 A1* | 5/2015 | Choi | H04N 21/4342 386/284 |
| 2015/0181158 A1* | 6/2015 | Xu | G06T 3/4007 348/441 |

FOREIGN PATENT DOCUMENTS

| CN | 103152541 A | 6/2013 |
| CN | 203313319 U | 11/2013 |
| CN | 103702060 A | 4/2014 |
| WO | 2012157618 A1 | 11/2012 |

OTHER PUBLICATIONS

Written Opinion of the International Search Report for PCT/CN2014/078024 with English translation, 8 pages.
International Search Report dated Aug. 22, 2014 for PCT/CN2014/078024 in Chinese.
Written Opinion dated Sep. 24, 2014 for PCT/CN2014/078024 in Chinese.
Chinese Office Action and English Translation dated Nov. 4, 2015, for corresponding Chinese Application No. 201310750548.3.

* cited by examiner

ULTRA HIGH DEFINITION DISPLAY DEVICE AND VIDEO SIGNAL CONVERTING METHOD

BACKGROUND OF THE INVENTION

1. Field of the Invention

Embodiments of the present invention relate to a field of displaying technology, and particularly, to an ultra high definition display device and a video signal converting method.

2. Description of the Related Art

An Ultra High Definition (UHD) displaying is an improvement to a full high definition (FHD) displaying, in the displaying technology. In UHD Standard issued by International Telecommunication Union (ITU), it is proposed that a display screen with a resolution of 3840×2160 or more is called as an ultra high definition display device. The resolution of an ultra high definition display is two times of that of a FHD display (with a resolution of 1920×1080) in width and height and is four times of that in area. With increasing requirements in video definition from people, application of an UHD display device becomes wider.

Current UHD display device is only to receive an ultra high definition signal with a resolution of 3840×2160. However, most of current media provide a full high definition signal with a resolution of 1920×1080. In this condition, range of application of an UHD display device is thus limited.

SUMMARY OF THE INVENTION

It is an object of the present invention to provide an ultra high definition display device and a video signal converting method, which are able to receive a full high definition signal, and convert the full high definition signal to an ultra high definition display signal for output under the control of a control module.

According to an aspect of the present invention, there is provided an ultra high definition display device, comprising:
 a first input port configured to receive a first signal;
 a control module configured to generate a first enabling signal.
 a first receiver module configured to receive the first signal from the first input port according to the first enabling signal, and generate a second signal by a format conversion, both the first signal and the second signal being full high definition signals;
 a resolution transformation module configured to perform a resolution transformation on the second signal to generate a third signal, the third signal being an ultra high definition signal; and
 a transmission module configured to convert the third signal into an ultra high definition display signal and output the display signal.

In an embodiment of the ultra high definition display device, the control module is further configured to generate a second enabling signal, and the ultra high definition display device further comprises: a second input port configured to receive a fourth signal; and a second receiver module configured to receive the fourth signal from the second input port according to the second enabling signal and, generate a fifth signal by a format conversion, both the fourth signal and the fifth signal being ultra high definition signals. The transmission module is further configured to convert the fifth signal into an ultra high definition display signal and output the display signal.

In the above embodiment of the ultra high definition display device, the first receiver module comprises a first format conversion submodule configured to convert the first signal into the second signal in RGB format; and, the second receiver module comprises a second format conversion submodule configured to transform the fourth signal to the fifth signal in RGB format.

In the above embodiment of the ultra high definition display device, the transmission module comprises an upconversion submodule configured to transform the third signal or the fifth signal received to a sixth signal with a frequency of 120 Hz; and a third format conversion submodule which is configured to convert the sixth signal into a high speed display signal in serial format.

In the above embodiment of the ultra high definition display device, the ultra high definition display device further comprises a memory module; wherein the first receiver module further comprises a first writing unit configured to write the second signal into the memory module; and the second receiver module further comprises a second writing unit configured to write the fifth signal into the memory module.

In the above embodiment of the ultra high definition display device, the resolution transformation module further comprises: a first reading unit configured to obtain the second signal from the memory module; and a third writing unit configured to write the third signal into the memory module; and the transmission module further comprises a second reading unit configured to obtain the third signal or the fifth signal from the memory module.

In the above embodiment of the ultra high definition display device, the ultra high definition display device further comprises an ultra high definition display screen that is coupled to an output port of the transmission module so as to display the display signal.

According to another aspect of the invention, there is provided a video signal converting method, comprising the steps of:
 (1) converting a first video signal in format into a second video signal when the first video signal received is a full high definition signal, the second video signal being a full high definition signal;
 (2) performing a resolution transformation on the second video signal, to generate a third video signal, the third video signal being an ultra high definition signal;
 (3) transforming the third video signal to a display signal for output.

In a further embodiment, the video signal converting method further comprises the steps of:
 (4) converting a fourth video signal in format into a fifth video signal when the fourth video signal received is an ultra high definition signal, the fifth video signal being an ultra high definition signal; and
 (5) converting the fifth video signal into a display signal for output.

In the above video signal converting method, the second video signal and the fifth video signal are in RGB format; and the step (3) comprises: converting the third video signal into a sixth video signal with a frequency of 120 Hz and converting the sixth video signal into a high speed display signal in serial format.

In the above video signal converting method, the step (5) comprises: converting the fifth video signal into a seventh video signal with a frequency of 120 Hz, and converting the seventh video signal into a high speed display signal in serial format.

In the above video signal converting method, the video signal converting method further comprises the steps of: between the step (1) and the step (2), writing the second video signal into a memory and reading the second video signal from the memory; between the step (2) and the step (3), writing the third video signal into the internal memory and reading the third video signal from the memory; and, between the step (4) and the step (5), writing the fifth video signal into the memory and reading the fifth video signal from the memory.

The ultra high definition display device and the video signal converting method according to embodiments in the present invention are able to convert a full high definition signal input from the first input port and output an ultra high definition display signal by using a first receiver module, a resolution transformation module and a transmission module, and further, to convert an ultra high definition signal input from the second input port and output an ultra high definition display signal. In this way, the device can not only receive a full high definition signal, but also receive an ultra high definition signal, and can achieve conversions from the two types of signals to ultra high definition display signals.

BRIEF DESCRIPTION OF THE DRAWINGS

In order to illustrate technical solutions in embodiments of the present invention and the prior art, the accompanying drawings will be used during describing the embodiments or the prior art and are provided and briefly described herein, in which.

DETAILED DESCRIPTION OF THE PREFERRED EMBODIMENTS

Technical solutions of the present invention will be described explicitly and fully hereinafter in detail by the way of embodiments with reference to figures of the attached drawings. Obviously, the described embodiments are only parts of embodiments of the present invention, rather than all the embodiments. Other embodiments obtained without involving inventive labors by those skilled in the art based on the described embodiments of the present invention fall into the scope of the present invention.

In addition, in the following description, details of embodiments are expounded concretely for explanation. However, it is noted that one or more embodiments may be implemented without explanation of the details by those skilled in the art. In any other case, the known structures and devices are shown in schematic view to simplify the accompanying drawings.

According to general conception of the present invention, there is provided an ultra high definition display device, comprising: a first input port configured to receive a first signal; a control module configured to generate a first enabling signal; a first receiver module, which is configured to receive the first signal from the first input port according to the first enabling signal, and generate a second signal by a format conversion, both the first signal and the second signal being full high definition signals; a resolution transformation module configured to perform a resolution transformation on the second signal to generate a third signal, the third signal being an ultra high definition signal; and a transmission module configured to convert the third signal into an ultra high definition display signal and output the display signal.

Figure 1:
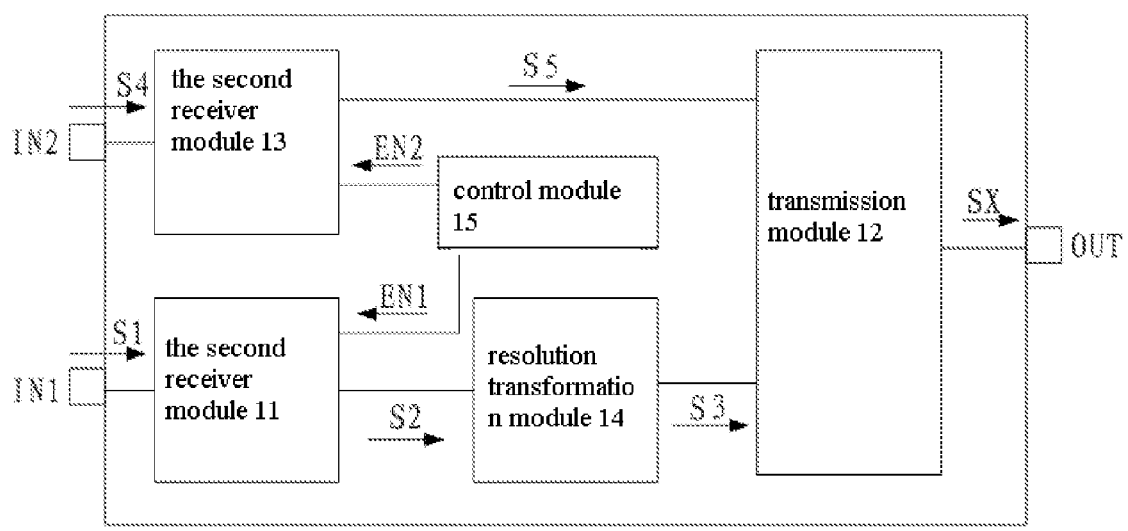
FIG. 1 is a principle block diagram of an ultra high definition display device according to an exemplary embodiment of the present invention.

FIG. 1 is a principle block diagram of an ultra high definition display device according to an exemplary embodiment of the present invention. As shown in FIG. 1, the ultra high definition display device according to the embodiment of the present invention comprises a first input port IN1 configured to receive a first signal S1; a control module 15 configured to generate a first enabling signal EN1; a first receiver module 11, which is coupled to the first input port IN1 and is configured to receive the first signal S1 from the first input port IN1 according to the first enabling signal EN1 and generate a second signal S2 by a format conversion, both the first signal S1 and the second signal S2 being full high definition signals; a resolution transformation module 14 configured to perform a resolution transformation on the second signal to generate a third signal S3, the third signal S3 being an ultra high definition signal; and a transmission module 12 which is coupled to an output port OUT and is configured to convert the third signal S3 to a display signal SX and output the display signal SX from the output port OUT.

According to a further exemplary embodiment of the ultra high definition display device of the present invention, the control module 15 is further configured to generate a second enabling signal EN2. The ultra high definition display device further comprises: a second input port IN2 configured to receive a fourth signal S4; and a second receiver module 13 configured to receive the fourth signal S4 from the second input port IN2 according to a second enabling signal EN2 and, generate a fifth signal S5 by a format conversion, both the fourth signal S4 and the fifth signal S5 being ultra high definition signals. The transmission module 12 is further configured to convert the fifth signal S5 into an ultra high definition display signal SX and output the display signal SX at the output port OUT.

During operation, the control module 15 is able to detect whether or not signals are inputted at the first input port IN1 and the second input port IN2. When a signal is inputted at the first input port IN1, a first enabling signal EN1 is transmitted to the first receiver module 11. When a signal is inputted at the second input port IN2, a second enabling signal EN2 is transmitted to the second receiver module 13.

In the ultra high definition display device according to the embodiment of the present invention, a full high definition signal inputted at the first input port can be converted and outputted as an ultra high definition display signal by using a first receiver module, a resolution transformation module and a transmission module, and, an ultra high definition signal inputted at the second input port can be converted and outputted as an ultra high definition display signal by using a second receiver module and a transmission module, thereby the device can not only receive a full high definition signal, but also receive an ultra high definition signal, and the device, by the control of the control module, can achieve conversions from two types of signals to ultra high definition display signals.

In addition, since the control module may receive a full high definition signal from a first port by transmitting a first enabling signal to a first receiver module, or receive an ultra high definition signal from a second port by transmitting a second enabling signal to a second receiver module, thereby achieving automatic switch between the full high definition signal and the ultra high definition signal.

It should be noted that the solid arrow in FIG. 1 represents the flow direction of the signals.

Figure 2:
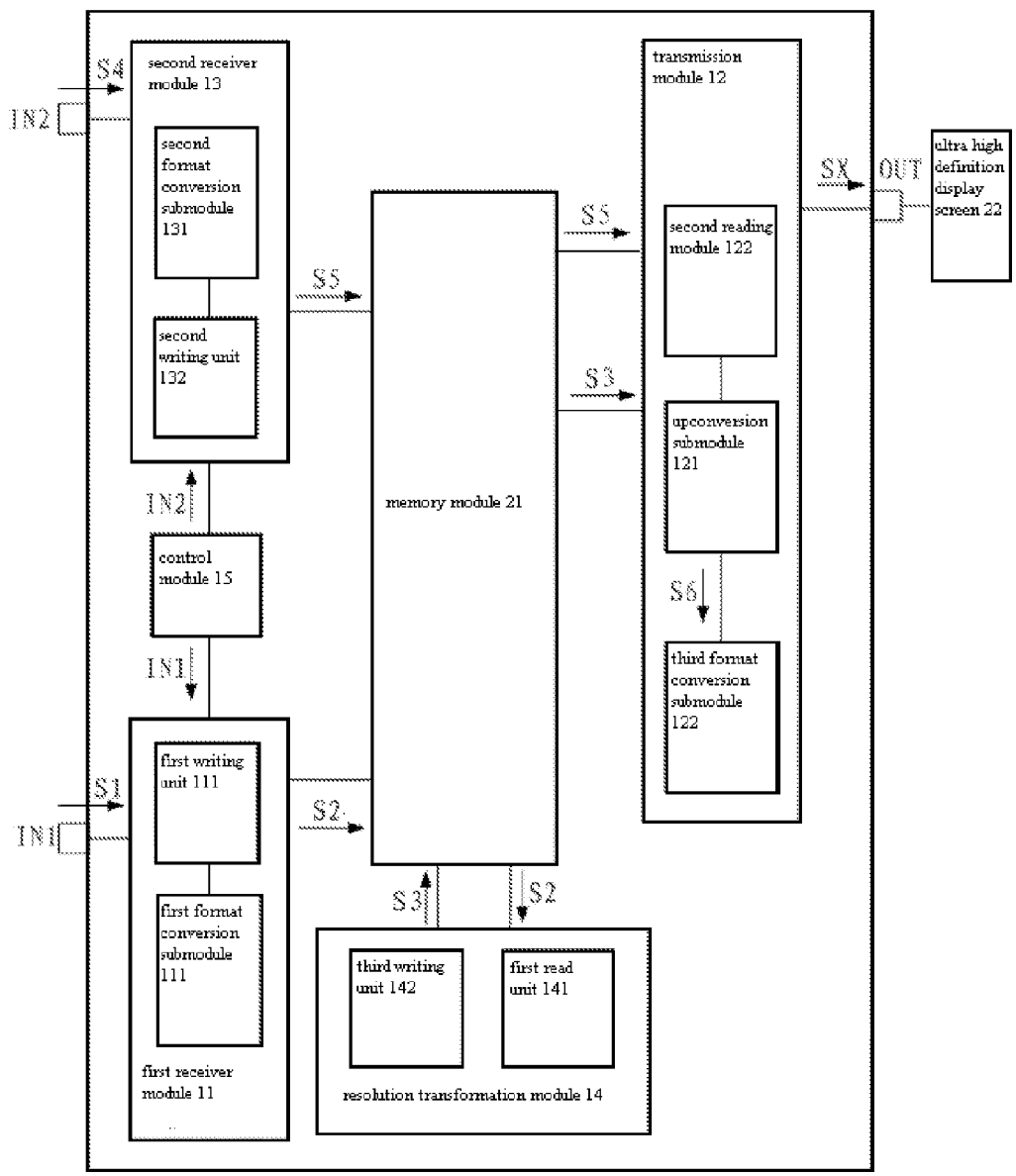
FIG. 2 is a principle block diagram of a further ultra high definition display device according to another exemplary embodiment of the present invention, based on the one shown in the exemplary embodiment of FIG. 1.

FIG. 2 shows an ultra high definition display device according to another exemplary embodiment of the present invention, based on the one shown in the exemplary embodiment of FIG. 1.

The first signal S1 (full high definition signal) received at the first input port IN1 is generally a Digital Visual Interface (DVI) signal. DVI is a basic electrical connection based on Transition Minimized Differential Signaling (TMDS) electronic agreement and thus the DVI signal possesses advantages of high speed and low distortion. The first signal S1 is needed to be decoded, i.e., to perform a format conversion, before its resolution transformation. Generally, the first signal will be converted to be in RGB format, convenient for subsequent data processing. Accordingly, in the ultra high definition display device shown in FIG. 2, the first receiver module 11 may include a first format conversion submodule 111 configured to convert the first signal S1 into a second signal S2 in RGB format.

In addition, a fourth signal (ultra high definition signal) S4 received at the second input port IN2 is a Low-Voltage Differential Signaling (LVDS) signal, which is a signal with low noise and low power consumption. The fourth signal S4 is needed to be decoded, i.e., to perform a format conversion, before being converted to a display signal SX. Generally, the signal is converted to be in RGB format, convenient for subsequent data processing. Accordingly, the ultra high definition display device according to an embodiment of the present invention, which may be that shown in FIG. 2, may include a second format conversion submodule 131 configured to convert the fourth signal S4 into a fifth signal S5 in RGB format. According to an exemplary embodiment of the present invention, the abovementioned LVDS signal and DVI signal belong to serial signal with a clock frequency of 60 Hz. Upon RGB format conversion, clock frequencies of the second signal S2 and fifth signal S5 remain unchanged, and clock frequency of the third signal S3 which is obtained from the second signal S2 after resolution transformation also remains unchanged. As for an ultra high definition display, an ultra high definition signal is needed to have a frequency of 120 Hz. That is, the converted third signal S3 or the converted fifth signal S5 with a frequency of 60 Hz are needed to be upconverted. At this point, in the ultra high definition display device shown in FIG. 2, the transmission module 12 may include an upconversion submodule 121 configured to convert the converted third signal or the converted fifth signal into the sixth signal S6 with a frequency of 120 Hz.

In addition, in order to rapidly output the sixth signal S6 with high frequency so as to achieve better high definition display, in the ultra high definition display device shown in FIG. 2, the transmission module 12 may further include the third format conversion submodule 122 configured to convert the sixth signal S6 to a high-speed display signal into serial format SX.

In a conventional ultra high definition display device, the signal processing speeds of these modules cannot be ensured to be complete the same. In other words, a posterior module with a lower processing speed may still be processing a signal of a previous period, when a preceding module with a higher processing speed has gone over a current signal. As a result, the preceding module has to transmit the processed signal to the posterior module after the posterior module has completed the processing, and then continues to perform other signal processings. Due to existence of a waiting time, process efficiency of the modules is hard to be improved.

In order to overcome the disadvantage, as shown in FIG. 2, the ultra high definition display device according to the embodiment of the present invention may be provided with a memory module 21, such as Double Data Rate SDRAM (DDR SDRAM).

Accordingly, the first receiver module 11 may further include a first writing unit 112 configured to write the second signal S2 into the memory module 21; and, a second receiver module 13 may further include a second writing unit 32 configured to write the fifth signal S5 into the memory module 21. Further, the resolution transformation module 14 may further include a first reading unit 141 configured to obtain the second signal S2 from the memory module 21; and, a third writing unit 142 configured to write the third signal S3 which is converted from the second signal S2 into the memory module 21. The transmission module 12 may further include a second reading unit 122 configured to obtain the third signal S3 or the fifth signal S5 from the memory module 21.

As a memory module 21 is provided, the first signal S1 which is inputted to the first receiver module 11 is performed a format conversion to generate the second signal S2. Then, the second signal S2 is written by the writing unit 112 into the memory module 21. The second signal S2 is read by the first reading unit 141 of the resolution transformation module 14 from the memory module 21 and then is performed a resolution transformation to generate the third signal S3. The third signal S3 is written by the third writing unit 142 into the memory module 21, and may be read by the second reading unit 122 of the transmission module 12 from the memory module 21, and then is performed the processings of upconversion and format conversion.

On the other hand, the fourth signal S4 which is inputted to the second receiver module 13 is performed a format conversion to generate the fifth signal S5. Then the fifth signal S5 is written by the second writing unit 132 into the memory module 21. The fifth signal S5 may be read by the second reading unit 122 of the transmission module 12 from the memory module 21, and then is performed the processings of upconversion and format conversion.

Due to provision of the memory 21, the processed data from each module may be stored in the memory 21 and may be read by subsequent module as required from the memory 21 for use. Thus, even though each of the modules processes in different speed, they will not be affected one another, thereby eliminating the waiting time among modules and thus sufficiently improving processing efficiency of the modules.

It is noted that the above ultra high definition display device may further include an ultra high definition display screen 22, which is coupled to the output port OUT and is configured to display the display signal, achieving an ultra high definition displaying.

It is also noted that the solid arrow in FIG. 2 represents the flow direction of the signals.

Figure 3:
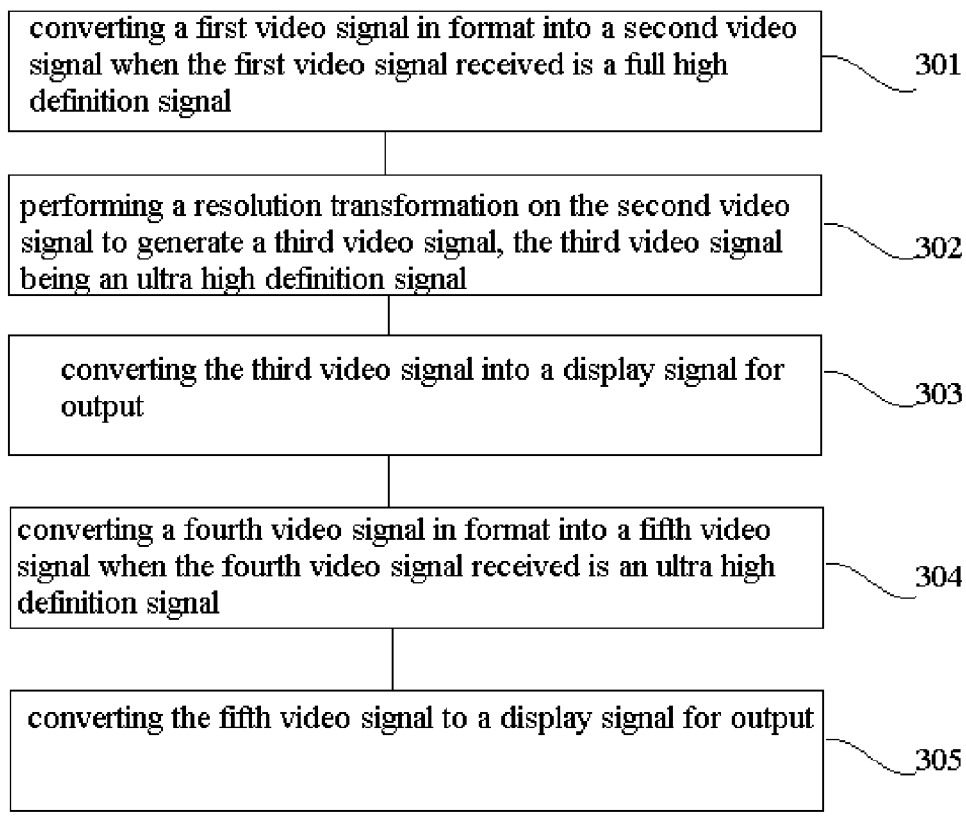
FIG. 3 is a flow chart illustrating a video signal converting method according to an exemplary embodiment of the present invention.

According to a further exemplary embodiment of the present invention, there is provided a video signal converting method. As shown in FIG. 3, the method comprises the steps of:

step 301: converting a first video signal in format into a second video signal when the first video signal received is a full high definition signal, the second video signal being a full high definition signal;

step 302: performing a resolution transformation on the second video signal to generate a third video signal, the third video signal being an ultra high definition signal; and step 303: converting the third video signal into a display signal for output.

According to a further embodiment of the present invention, the video signal converting method further comprises the steps of:

step 304: converting a fourth video signal in format into a fifth video signal when the fourth video signal received is an ultra high definition signal, the fifth video signal being an ultra high definition signal; and step 305: converting the fifth video signal to a display signal for output.

It is understood that the video signal converting method according to the embodiment of the present invention may be performed by the ultra high definition display device shown in FIG. 1. According to the converting method, when a full high definition signal is received, it is converted into an ultra high definition display signal for output, and, when an ultra high definition signal is received, it is converted to an ultra high definition display signal for output. In this way, the method can perform conversions for an ultra high definition signal and for a full high definition signal, to achieve an ultra high definition displaying. The method thus overcomes limitation of range of application of the ultra high definition display device in prior art and achieves automatic switch between the two signals.

Figure 4:
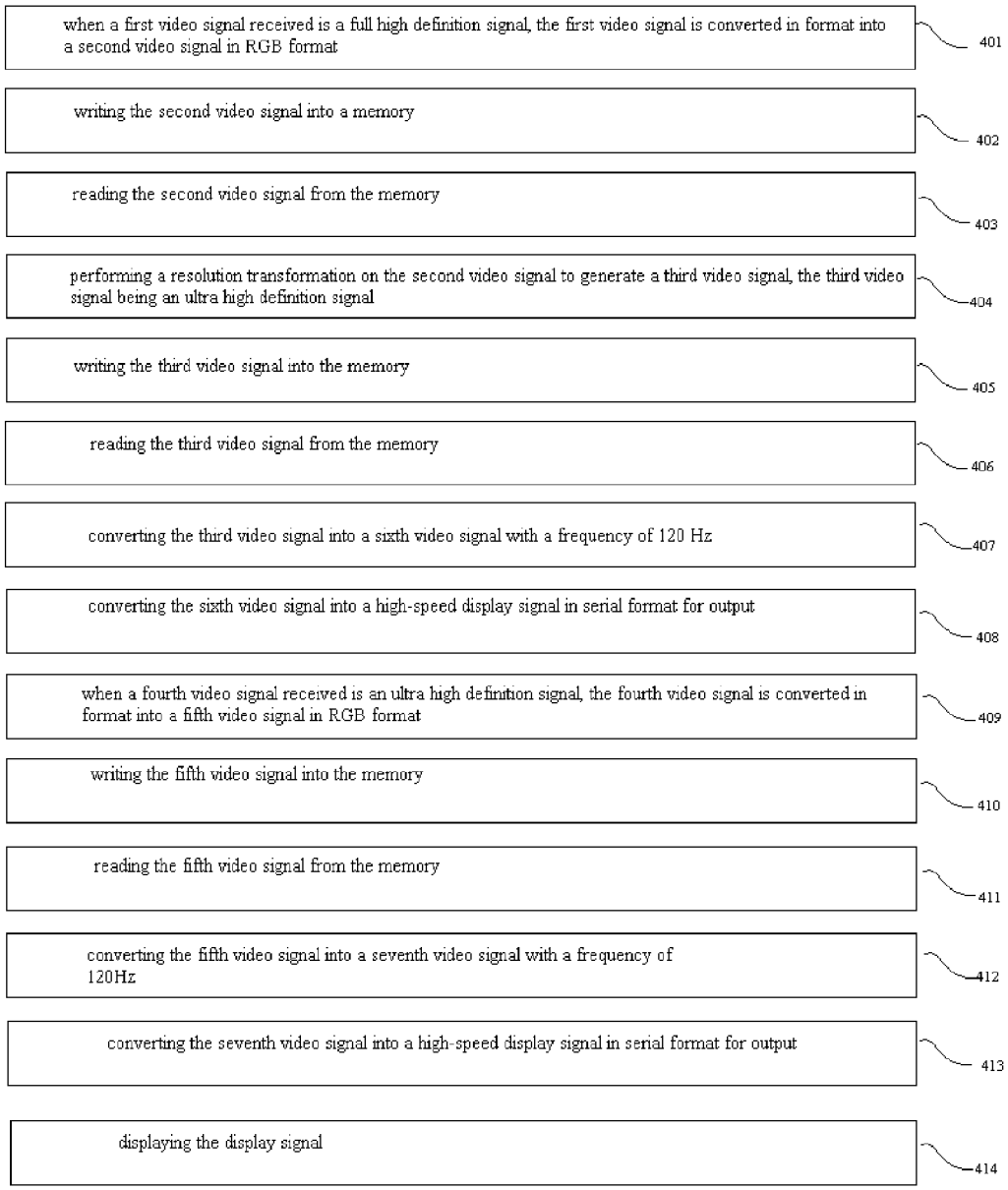
FIG. 4 is a flow chart illustrating a further video signal converting method according to another exemplary embodiment of the present invention, based on the one shown in the exemplary embodiment of FIG. 3.

During a video signal conversion performed on the ultra high definition display device as shown in FIG. 2, the converting method shown in FIG. 4 comprises the steps of:

step 401: when a first video signal received is a full high definition signal, the first video signal is converted in format into a second video signal in RGB format, the second video signal being a full high definition signal;

step 402: writing the second video signal into a memory;

step 403: reading the second video signal from the memory;

step 404: performing a resolution transformation on the second video signal to generate a third video signal, the third video signal being an ultra high definition signal;

step 405: writing the third video signal into the memory;

step 406: reading the third video signal from the memory;

step 407: converting the third video signal into a sixth video signal with a frequency of 120 Hz; and step 408: converting the sixth video signal into a high-speed display signal in serial format for output.

Further, the video signal converting method according to the embodiment of the present invention further comprises the steps of:

step 409: when a fourth video signal received is an ultra high definition signal, the fourth video signal is converted in format into a fifth video signal in RGB format, the fifth video signal being an ultra high definition signal;

step 410: writing the fifth video signal into the memory;

step 411: reading the fifth video signal from the memory;

step 412: converting the fifth video signal into a seventh video signal with a frequency of 120 Hz; and step 413: converting the seventh video signal into a high-speed display signal in serial format for output.

Based on the converting method illustrated in FIG. 3, the video signal converting method shown in FIG. 4 is a further refinement, in which steps of RGB format conversion, upconversion, high speed serial format conversion and reading/writing from/into the memory are added. The above added steps have been specifically described during the interpretation of the ultra high definition display device with reference to FIG. 2 and thus the explanation thereof is omitted.

According to the video signal converting method, when a full high definition signal is received, it is converted into an ultra high definition display signal for output, and, when an ultra high definition signal is received, it is converted into an ultra high definition display signal for output. In this way, the method can perform conversions for an ultra high definition signal and for a full high definition signal, so as to achieve an ultra high definition displaying. The method may also achieve automatic switch between the above two signals.

It should be noted that the above video signal converting method further includes step 414: displaying the display signal such that the signal may finally be displayed on the display screen.

Embodiments of the ultra high definition display device are described to include two input ports and the two input ports are respectively inputted by a full high definition signal and an ultra high definition signal. However, the present invention is not limited to this. In an alternative embodiment, an ultra high definition display device comprises: an input port configured to receive a first video signal; a control module configured to identify whether the first video signal is a full high definition signal or an ultra high definition signal, and to generate an enabling signal; a receiver module configured to receive the first video signal from the input port according to the enabling signal when the control module has identified the first video signal to be a full high definition signal, and where the first video signal is transformed in format to a second video signal; a resolution transformation module configured to perform resolution transformation on the second video signal to generate a third video signal, the third video signal being an ultra high definition signal; and, a transmission module configured to convert the third signal into an ultra high definition display signal and output the display signal. Further, when the control module has identified the first video signal to be an ultra high definition signal, the receiver module receives the first video signal from the input port according to the enabling signal and converts it in format into fourth video signal. The transmission module is configured to transform the fourth signal to an ultra high definition display signal and output the display signal.

In this embodiment, only one input port is provided and the control module is configured to identify whether the first video signal received from the input port is a full high definition signal or an ultra high definition signal. When the received first video signal is a full high definition signal, it is converted into an ultra high definition signal for output. When the received first video signal is an ultra high definition signal, it is converted into an ultra high definition display signal for output. In this way, the ultra high definition display device may perform conversions for an ultra high definition signal and for a full high definition signal, to achieve an ultra high definition displaying. Further, it may achieve automatic switch between the above two signals.

Although several embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What is claimed is:

1. An ultra high definition display device, comprising:
a first input port configured to receive a first signal;
a control module configured to generate a first enabling signal and a second enabling signal;
a first receiver module coupled to the first input port and to the control module, and configured to receive the first signal from the first input port according to the first enabling signal, and generate a second signal by a format conversion, both the first signal and the second signal being full high definition signals, wherein the first receiver module comprises a first format conversion submodule configured to convert the first signal into the second signal in RGB format;
a resolution transformation module configured to perform a resolution transformation on the second signal to generate a third signal, the third signal being an ultra high definition signal;
a transmission module configured to convert the third signal into a first ultra high definition display signal and output the first ultra high definition display signal;
a second input port configured to receive a fourth signal, the second input port being physically separated from the first input port; and
a second receiver module coupled to the second input port and to the control module, and configured to receive the fourth signal from the second input port according to the second enabling signal and, generate a fifth signal by a format conversion, both the fourth signal and the fifth signal being ultra high definition signals, the second receiver module comprising a second format conversion submodule configured to convert the fourth signal to the fifth signal in RGB format;
wherein the transmission module is further configured to convert the fifth signal into a second ultra high definition display signal and output the second ultra high definition display signal;
a memory module; wherein the first receiver module further comprises a first writing unit configured to write the second signal into the memory module; and the second receiver module further comprises a second writing unit configured to write the fifth signal into the memory module.

2. The ultra high definition display device according to claim 1, wherein, the transmission module comprises:
an upconversion submodule configured to convert the third signal or the fifth signal into a sixth signal with a frequency of 120 Hz; and
a third format conversion submodule configured to convert the sixth signal into a high speed display signal in serial format.

3. The ultra high definition display device according to claim 1, wherein, the resolution transformation module further comprises:
a first reading unit configured to obtain the second signal from the memory module; and
a third writing unit configured to write the third signal into the memory module; and
the transmission module further comprises a second reading unit configured to obtain the third signal or the fifth signal from the memory module.

4. The ultra high definition display device according to claim 1, further comprising:

an ultra high definition display screen that is coupled to an output port of the transmission module so as to display the first ultra high definition display signal.

5. A video signal converting method, comprising the steps of:
(1) receiving a first video signal by a first input port and converting the first video signal in format with a first receiver module coupled to the first input port that includes a first format conversion submodule configured to convert the first signal into a second video signal when the first video signal received is a full high definition signal, the second video signal being a full high definition signal in RGB format;
(2) performing a resolution transformation on the second video signal, to generate a third video signal, the third video signal being an ultra high definition signal;
(3) converting the third video signal into a first display signal, a first display signal having a different frequency than the third video signal for output;
(4) receiving a fourth video signal by a second input port that is physically separated from the first input port and converting the fourth video signal in format with a second receiver module coupled to the second input port that includes a second format conversion submodule configured to convert the fourth signal into a fifth video signal when the fourth video signal received is an ultra high definition signal, the fifth video signal being an ultra high definition signal in RGB format; and
(5) converting the fifth video signal into a second display signal, a second display signal having a different frequency than the fifth video signal for output;
(6) using a memory module; wherein the first receiver module further comprises a first writing unit configured to write the second signal into the memory module; and the second receiver module further comprises a second writing unit configured to write the fifth signal into the memory module.

6. The video signal converting method according to claim 5, wherein,
the step (3) comprises: converting the third video signal into a sixth video signal with a frequency of 120 Hz, and converting the sixth video signal into a high speed display signal in serial format.

7. The video signal converting method according to claim 5, wherein, the step (5) comprises: converting the fifth video signal into a seventh video signal with a frequency of 120 Hz, and converting the seventh video signal into a high speed display signal in serial format.

8. The video signal converting method according to claim 5, further comprising the steps of:
between the step (1) and the step (2), writing the second video signal into a memory and reading the second video signal from the memory;
between the step (2) and the step (3), writing the third video signal into the memory and reading the third video signal from the memory; and
between the step (4) and the step (5), writing the fifth video signal into the memory and reading the fifth video signal from the memory.

* * * * *